(12) United States Patent
Menth et al.

(10) Patent No.: US 8,279,750 B2
(45) Date of Patent: Oct. 2, 2012

(54) SIMPLE AND RESOURCE-EFFICIENT RESILIENT NETWORK SYSTEMS

(75) Inventors: Michael Menth, Oellingen (DE); Jens Milbrandt, Wurzburg (DE); Andreas Reifert, Aschaffenburg (DE); Phuoc Tran-Gia, Wurzburg (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 12/571,180

(22) Filed: Sep. 30, 2009

(65) Prior Publication Data

US 2010/0074103 A1 Mar. 25, 2010

Related U.S. Application Data

(63) Continuation of application No. 10/570,650, filed as application No. PCT/EP2004/052034 on Sep. 3, 2004, now abandoned.

(30) Foreign Application Priority Data

Sep. 3, 2003 (EP) .................................... 03014809
Sep. 13, 2003 (EP) .................................... 03020840

(51) Int. Cl.
*H04L 12/26* (2006.01)
(52) U.S. Cl. ......... 370/218; 709/223; 709/224; 709/226
(58) Field of Classification Search .......... 370/216–218; 379/1.01, 9, 14, 14.01; 709/223, 224, 226
See application file for complete search history.

(56) References Cited

U.S. PATENT DOCUMENTS 6,021,113 A * 2/2000 Doshi et al. .................. 370/228
(Continued)

FOREIGN PATENT DOCUMENTS

EP 1 300 992 A1 4/2003

OTHER PUBLICATIONS

Seongwook Lee, S. et al. xtiple MPLS Paths, Proceedings of 9th International Workshop on Quality of Service Jun. 6-8, 2001, Online! vol. 2092, Jun. 6, 2001, pp. 155-169, XP002322149 Karlsruhe, Germany, Retrieved from the Internet: URL:http://citeseer.ist.psu.edu/rd/34194627%C510138%2C1%2CO.25%2CDownload/http://citeseer.ist.psu.edu/cache/papers/cs/25988/http:zSzzSzwww.cs.ucla.eduzSz NRLzSzhpizSz.zSzpaperszSz2001-iwqos-0.pdf/lee01fault.pdf> retrieved on Mar. 22, 2005.

*Primary Examiner* — Charles C Jiang
(74) *Attorney, Agent, or Firm* — Laurence A. Greenberg; Werner H. Stemer; Ralph E. Locher

(57) ABSTRACT

The invention is related to a method for resilient multi-path connections between edge devices of a communication network. First are determined connection-specific traffic distribution functions for the multi-paths depending on a plausible failure pattern of active and inactive paths of the multi-path of this connection. Further is selected the traffic distribution function for a multi-path depending on the current failure pattern of active and an inactive paths of the multi-path of this connection and is distributed the traffic of the connection onto the path of the corresponding multi-path pursuant to the selected traffic distribution function. An essential advantage of the invention is a significant decrease of network capacity for resilient multi-path connections. Another advantage of the invention is the short reaction time in case of an outage of one or more paths of the multi-path connections.

17 Claims, 1 Drawing Sheet

U.S. PATENT DOCUMENTS

| | | |
|---|---|---|
| 7,352,703 B2 | 4/2008 | Elie-Dit-Cosaque et al. |
| 2002/0103631 A1* | 8/2002 | Feldmann et al. .............. 703/22 |
| 2002/0143929 A1* | 10/2002 | Maltz et al. ................... 709/224 |
| 2002/0150041 A1* | 10/2002 | Reinshmidt et al. .......... 370/216 |
| 2003/0081608 A1* | 5/2003 | Barri et al. .................... 370/392 |
| 2004/0218525 A1* | 11/2004 | Elie-Dit-Cosaque et al. 370/223 |

* cited by examiner

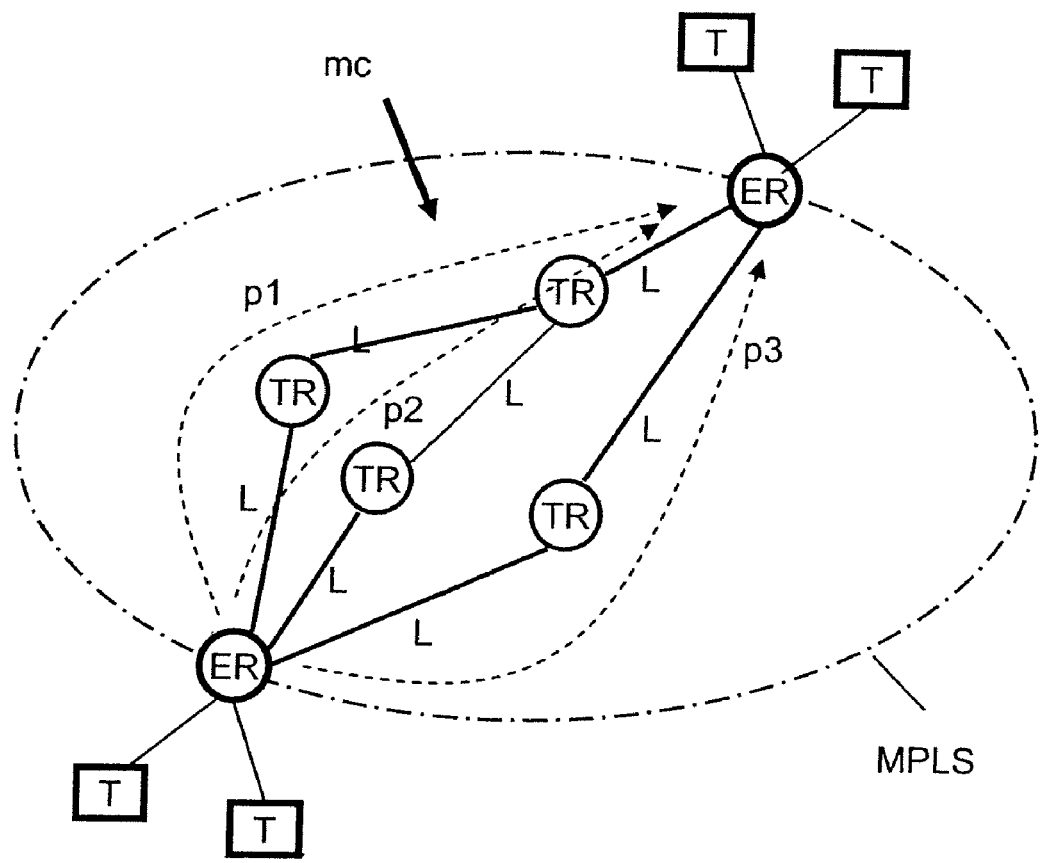

SIMPLE AND RESOURCE-EFFICIENT RESILIENT NETWORK SYSTEMS

CROSS REFERENCE TO RELATED APPLICATIONS

This application is a continuation of U.S. patent application Ser. No. 10/570,650, filed Dec. 21, 2006, which is the U.S. National Stage of International Application No. PCT/EP2004/052034, filed Sep. 3, 2004 and claims the benefit thereof The International Patent Application claims the benefit of European Patent Application No. 03020840.9, filed Sep. 13, 2003 and European Patent Application No. 03014809.2, filed Sep. 3, 2003. All of the applications are incorporated by reference herein in their entirety.

FIELD OF THE INVENTION

The inventive method is related to multi-path connections between edge devices in a communication network. The method is preferred provided for MPLS (Multi-Protocol Label Switching) communication networks.

BACKGROUND OF THE INVENTION

Carrier grade networks are expected to provided a high degree of availability although of in the networks elements can fail. This challenge arises, e.g., for virtual private networks or in the terrestrial radio access network of the universal mobile telecommunication system (UMTS). In contrast Internet Protocol (IP) technology enables a global interconnection of computer controlled devices, e.g., hosts, servers and terminals, on a unreliable best effort basis.

In time division networks, e.g., telephone networks, the reliability is ensured by hardware redundancy of the different network elements. Packet-oriented networks, e.g., the IP network, are protected against link failure by backup links or by ring shaped networks on the physical layer, e.g., SDH rings. However, these methods require a backup capacity which comprises at least the capacity of the failed network elements.

In packed-switched networks, a high degree of reliability can be achieved by traffic deviation over alternative paths in case of local outages. The backup capacity may be shared among different traffic aggregates in different failure scenarios. Therefore, the required backup capacity can be reduced without compromising the failure resilience of the network.

For the routing of the packets in packet switched networks there are two different routing methods. The routes in a destination address based routing used in the internet protocol (IP) are usually set up by the routing protocol like the open shortest path first protocol and the destination address transmitted in protocol header. Load balancing over multiple paths is possible if several routes to the same destination reveal the same costs. The traffic in connection-oriented routing used in MPLS networks is forwarded along virtual connections whereby each virtual connection is assigned a label. The virtual connections including the label are established or set up before the forwarding of the packets and the routes can be chosen arbitrarily, e.g. using an explicit route object in MPLS.

In packet-switched networks like IP and MPLS networks, traffic is deviated over alternative paths in case of a local outage. There are basically two options for resilient mechanisms.

With local path restoration in case of MPLS networks or with local rerouting in case of IP technology, a deviation path or route is only activated if a failure of the local network element is indicated. I.e., in IP networks a link failure is detected and indicated by missing hello messages of the open shortest path first protocol (OSPF). Backup capacity can be shared because no resources are bound to any aggregate before the failure is indicated. However, the reaction time of restoration mechanism especially for networks with high transmission rates is to long.

To avoid long reaction time with path protection, the primary path failure is anticipated, i.e., a back up path is set up before a failure is indicated, whereby the traffic is transmitted simultaneously over the primary and the backup path. In this case a backup capacity sharing is not possible.

A new approach for routing in packet-switched networks is multi-path routing. In the source network element, the traffic is distributed over the several paths wherein the paths are established connection-oriented. The distributed traffic is transmitted parallel over the paths and reassembled at the destination network element. If an outage of one or more network elements is indicated, i.e., if an inactive condition of the local network elements is indicated, the traffic is deflected to the remaining active paths.

SUMMARY OF THE INVENTION

In the discussed networks, the backup capacity for resilience is not used effectively. Therefore, it is an object of the invention to amend the effectiveness of the resources in the well-known resilient networks especially in connection-oriented networks wherein the resilience of the networks should be maintained.

According to the invention, a novel method for multi-path connections is provided for resilience of paths in communication networks. The method includes a calculation of connection-specific distribution functions for the multi-paths depending on path failure patterns of active and inactive paths of the multi-path of a specific connection. Furthermore, the selecting of the traffic distribution function is provided depending on the current path failure pattern and the distribution of the traffic pursuant to the selected traffic distribution function. An essential advantage of the invention is a significant decrease of network capacity for resilient multi-path connections. Another advantage of the invention is the short reaction time in case of an outage of one or more path of the multi-path connections.

Preferable, the calculation of the connection-specific distribution functions for the multi-paths further depends on the topology of the communication network, the routes of the paths of the multi-path through the communication network, and both the expected traffic between the edge devices and the available link capacities. Additional, parameters may be used for this calculation to take constraints for different technologies, networks, or characteristics of determined routes into account.

Pursuant further aspects of the invention, the paths of the multi-paths are logically or physically or link or node disjointed. Of particular importance are physically disjointed paths in multi-path connections because in case of a local outage of network elements the number of affected path is minimized. However, the computation of physically disjoint paths in multi-path connections depends on the topology of the network and can not always be achieved. Therefore, not all the paths of a multi-path may be disjoint.

BRIEF DESCRIPTION OF THE DRAWINGS

The sole FIGURE shows a Multi-Protocol Label Switching communication network connection with edge devices.

DETAILED DESCRIPTION OF THE INVENTION

The inventive method is related to multi-path connections between edge devices in a communication network. The method is preferred provided for MPLS (Multi-Protocol Label Switching) communication networks.

MPLS equipped with edge routers ER—see FIGURE. The edge routers ER are respectively connected to terminals T. In FIGURE, between two edge routers ER a multi-path connection mc which consists of three paths p1 ... p3 is exemplarily depicted. A path p is formed by a sequence of transit routers TR and links L. These paths or routes are determined in assistance of well-known routing algorithms, for instance the Dijkstra algorithm. For the computation of the paths, advantageous restrictions should be considered, for example the paths of the multi-path connection should be physically disjoint. The first and second path p1, p2 is composed of two transit routers TR and three links L. The third path p3 comprises one transit router TR and two links L, wherein the first and second path p1, p2 are partially physically disjoint. The first and second path p1, p2 are respectively completely physically disjointed from the third path p3.

For this embodiment is assumed that multi-path connections mc are established between the depicted edge routers ER. The number of paths and the sequence of transit router TR and links L depend on the topology of the MPLS network and the expected traffic transmitted over the paths p of the network. According to the invention a calculation of connection-specific distribution functions for the multi-paths depending on path failure pattern of this multi-path connection mc is provided.

In the following, the computation of the traffic distribution function is described:

Basic Notation:

Let X be a set of elements, then $X^n$ is the set of all n-dimensional vectors and $X^{n \times m}$ the set of all n×m-matrices with components taken from X. Vector $x \in X^n$ and matrices $X \in X^{n \times m}$ are written bold and their components are written as $$x = \begin{pmatrix} x_0 \\ x_{n-1} \end{pmatrix}$$

and X $$\begin{pmatrix} x_{0,0} & \cdots & x_{0,m-1} \\ x_{n-1} & \cdots & x_{n-1,m-1} \end{pmatrix}.$$

The scalar multiplication $c \cdot v$ and the transpose operator $\tau$ are defined a usual. The scalar product o two n-dimensional vectors u and v is written with the help of matrix multiplication $$u^\top v = \sum_{i=1}^{n} u_i v_i.$$

Binary operators $o \in \{*, -, \cdot\}$ are applied componentwise. i.e. $u \, o \, v = (u_0 \, o \, v_0, \ldots, u_{n-1} \, o \, v_{ne1})\tau$. The same holds for relational operators $o \in \{<, \leq, =, \geq, >\}$, i.e. $u \, o \, v$ equals $\forall = \leq, i < n: u_i \, o \, v_i$. For reasons of simplicity, we define special vectors $0 = (0, \ldots, 0)\tau$ and $1 = (1, \ldots, 1)\tau$ with context-specific dimensions.

Links and Nodes:

The Network N=(V,E) consists of n=|V| nodes and m=|E| unidirectional links that are represented a unit vectors $v_i \in \{0,1\}$ and $e_i \in \{0,1\}^m$, i.e.

$$(v_i)_j = \begin{cases} 0 & i \neq j \\ 1 & i = j \end{cases} \quad \text{for } 0 \leq i, j < n \text{ and} \tag{1.1}$$

$$(e_i)_j = \begin{cases} 0 & i \neq j \\ 1 & i = j \end{cases} \quad \text{for } 0 \leq i, j < n \tag{1.2}$$

The links are directed and the operators $\alpha(e_i)$ and $\omega(e_i)$ yield the sending and the receiving router of a link. The outgoing and incoming incidence matrices $A_\alpha$ and $A_\omega$ describe the network connectivity, i.e.

$$(a_\alpha)_{ij} = \begin{cases} 0 & \alpha(e_j) \neq v_i \\ 1 & \alpha(e_j) \neq v_i \end{cases} \text{ and} \tag{1.3}$$

$$(a_\omega)_{ij} = \begin{cases} 0 & \omega(e_j) \neq v_i \\ 1 & \omega(e_j) \neq v_i \end{cases} \text{ for } 0 \leq i, j < n. \tag{1.4}$$

The indicence matrix $A \in -1, \{0,1\}^{n \times m}$ id defined as $A = A_\omega - A_\alpha$. The j-th column of A indicates the source and target of link $e_j$. The vector $Ae_j$ yields a node vector. It has a −1 in the i-th row if the source node of $e_j$ is $v_i$, it has a 1 in the i-th row if the target node of $e_j$ is $v_i$, and there are zeros in all other positions. The j-th row of A indicates the outgoing and incoming links of node $v_j$. The link vector $v_j \tau A$ has a −1 for all outgoing links, a 1 for all incoming link, and zeros in all other positions. Loops cannot be expressed by this formation.

Traffic, Matrix, Paths, and Flows:

The Matrix: The aggregate of all flows from an ingress router $v_i$ to an egress router $v_j$ is denoted by the edge to edge aggregate $g_{vi,vj}$. All edge to edge aggregates compose the set $g \in G$ is given by $c(g)$ and corresponds to an entry on the traffic matrix.

Path: A path $p_g$ of an aggregate $g \in G$ between distinct nodes $v_\alpha$ and $v_\omega$ is a set of contiguous links presented by a link vector $p_g \in \{0,1\}^m$. This corresponds to a single path However, we usually apply the concept of multi-path $p_g \in \{0,1\}^m$, which is more general since the traffic may be split into several partial paths carrying a real fraction of traffic. A path follows conservation rules, i.e., the amount of incoming traffic equals the amount of outgoing traffic in a node which is expressed by $$Ap_g = (v_\omega - v_\alpha). \tag{1.5}$$

While cycles containing only inner nodes can be easily removed, cycles containing the start and the end node of a path are more problematic. Therefore, it is formulated a condition preventing this case. The expression $v_\alpha \tau A_\omega$ and $v_\omega \tau A_\alpha$ yield the incoming edges of start node $v_\alpha$ and all outgoing edges of the end node $v_\omega$ of a path $p_g$. Hence, cycles containing the start or end node can be prevented if the following equations hold:

$$(v_\alpha \tau A_\omega) p_g = 0 \text{ and } (v_\omega \tau A_\alpha) p_g = 0. \tag{1.6}$$

Flows: The mere path of an aggregate $g \in G$ is $p_g$. We get the corresponding flow by a scalar multiplication $c(g) \cdot p_g$ to take the rate of aggregate into account.

Protected scenarios: A protected failure scenario is given by a vector of failed nodes $s_v \in \{0,1\}^n$ and a vector failed links $s_e \in \{0,1\}^m$. The set S contains all protected outage scenarios including $s=0$, i.e. the no failure case.

Traffic reduction: During normal operation without any failure, all aggregates g∈ G are inactive. If routers fail, some may disappear. There are to consider several options.

No Traffic Reduction: It is assumed that failed routers lose only their transport capability for transit flows but still able to generate traffic. Therefore $G_s=G$.

Source Traffic Reduction: An aggregate flow is removed from the traffic matrix if the source node $v_i$ of aggregate $g_{vi,vj}$ fails. If a failed node is the destination of a flow, "server push" traffic may still be transported through the network, hence $$G_s = G \setminus \{g_{vi,vj} : v_i^T s_v = 1, 1 \leq j \leq n, i \neq j\}. \quad (1.7)$$

Full traffic reduction: In contrast to above it is assumed that the traffic with a failed destination is stalled. An aggregate flow is removed from the traffic matrix if a node fails which either the source or the destination of a flow, hence $$G_s = G \setminus \{g_{vi,vj} : v_i^T s_v = 1, 1 \leq j \leq n, i \neq j\} \cup \quad (1.8)$$

$$\{g_{vi,vj} : v_j^T s_v = 1, 1 \leq j \leq n, i \neq j\} \quad (1.9)$$

Failure indication function: The failure indication function $\Phi(p,s)$ indicates whether a path p is affected by a failure scenario s. Path p is affected by a link failure scenario $s_\epsilon$ if $s_\epsilon \tau > 0$. To formulate this analogously for node failures it is defined traces. The α-trace is $tr_\alpha(p_g)=A_\alpha p_g$ and the ω-trace is $tr_\omega(p_g)=A_\omega p_g$, respectively. It is obtained the interior trace ti by executing the corresponding end or start node of the α- or ω-trace, respectively, i.e. $ti(p_g)=A_\alpha p_g - v_\alpha = A_\omega p_g - v_\omega$. Path p is affected by a node failure scenario $s_v$ if $s_v \tau ti(p)>0$. Finally, the failure indication function is $$\Phi(p,s) = \begin{cases} 1 & s_e^T p + s_v^T ti(p) > 0 \\ 0 & \text{otherwise.} \end{cases} \quad (1.10)$$

Protection alternatives: A path restoration scheme introduces a backup path $q_g$ which is activated if the primary path fails. This backup path protects against link and/or node failure of each primary path $p_g$ depending on the required type of resilience. A backup path is link protected if $$q_g \tau p_g = 0 \quad (1.11)$$

and is both link and node protecting if the following holds $$ti(q_g)\tau ti(p_g)=0. \quad (1.12)$$

Objective function and capacity constrains: It is described the capacity of all links by a vector of edges b∈ $(R_0^+)^m$. The overall capacity in the network is the objective function that is to be minimized. It can be computed by $$w\tau b \to \min \quad (1.13)$$

where w∈ $(R_0^+)^m$ is a vector of weights, that is normally set to w=1. If the connectivity is maintained by backup path in case of failure scenario s∈ S, the following bandwidth constrains guarantee that enough capacity is available to carry the traffic generated by the aggregate g∈ G.

Bandwidth reuse: In pure packet-switched networks, resources are not physically dedicated to any flow. If traffic is rerouted due to an outage, the resources can be automatically reuse for transporting other traffic. Under this assumption, the capacity constraints are $$\forall_s \in S: \sum_{g \in G_s} c(g) \cdot ((1 - \Phi(p_g, s)) \cdot p_g + \Phi(p_g, s) \cdot q_g) \leq b \quad (1.14)$$

No bandwidth reuse: In optical networks, physical resources like fibers, wavelengths, or time slots are bound to connections. If a network element fails, there might not be enough time to free the resources of a redirected connection. This is respected by the following capacity constraints:

$$\forall_s \in S: \sum_{g \in G_s} c(g) \cdot p_g + \sum_{g \in G_s} c(g) \cdot \Phi(p_g, s) \cdot q_g \leq b. \quad (1.15)$$

Optimal solution summary: The free variables to be set by the optimization are $$b \in (R_0^+)^m \text{ and } \forall s \in G : p_g q_g \in [0,1]^m. \quad (1.16)$$

Both the primary path $p_g$ and the backup path $q_g$ conform to the conversation rule equation (1.5) and exclude start and end nodes explicity from cycles by equation (1.6). The protection of path $p_g$ is achieved if the backup path $q_g$ respect either equation (1.11) or (1.12) for link protection or for link and node protection, respectively. The capacity constraints have to met either with or without bandwidth reuse ((equation (1.14) and (1.1)). The objective function in equation (1.13) is to be minimized while all these constraints are taken into account.

Unfortunately, the path protection constraints (equation (1.11)) and the equation (1.12) are quadratic with respect to the free variables. Therefore, this description can not be solved by LP (linear program) solvers. In addition, the failure indication function $\Phi(p,s)$ cannot be transformed into a linear mapping. Thus, there is no efficient algorithm to compute the desired structures $p_g$ and $q_g$. If the complexity of the primary and the backup multi-paths is restricted, e.g. to single-paths, the computation becomes more difficult due to a required integer solution for $p_g$ and $q_g$. The modelling of disjoint multi-paths solutions is even more difficult. Therefore heuristics are used.

Heuristic for path calculation:

Due to the computational problems and due the difficulty of controlling the structure of multi-paths first should be calculated a suitable path layout and then should be derivate a suitable traffic distribution function. Then is calculated a link and a node disjoint multi-path structure by using an algorithm to compute the k disjoint shortest paths (kDSP). Another heuristic tries to place a primary path in preferred way for PP methods. If a primary path is given, the kDSP algorithm may be used for the computation of a link and a node disjoint multi-path for backup purposes. Another option is the computation of an optimal path layout together with traffic distribution function. This method yields a general multi-path and is, therefore, not suitable in practice.

The k disjoint shortest path algorithm:

Both PP method and the inventive approach require disjoint multi-paths for their path layout. A very simple solution to get disjoint paths is taking the shortest p which can be found by Dijkstra's algorithm, removing its interior node te(p) and links tr(p) from the network running Dijkstra's algorithm again. However, this procedure does not always find k disjoint paths in the network although the might be topology feasible. In contrast to online solutions, the k disjoint shortest path (kDSP) offline algorithm finds always up to k disjoint shortest path in the network if they exist. These paths may be taken as the equal paths of an safe protecting mult-path. If they are taken for layout of path protection mechanism, the shortest one of them should become the primary path and the other paths constitute the muliti-path for backup purposes.

Primary path computation: minimum traffic routing:

With path protection the primary path plays a distinguished role. If a network element carries a large amount of traffic and fails, this traffic has to be redistributed and requires a lot of backup capacity near the outage location. Therefore, a path layout is constructed that entails a minimum traffic load on each network element.

Minimum traffic constraints:

The overall traffic on all links is giver by the auxiliary vector $a^E \in (R_0^+)^m$ and the overall traffic on all links is given by the auxiliary vector $a^V \in (R_0^+)^n$, respeciively $$a^E = \sum_{g \in G} f(g) \cdot p_g \text{ and } a^v = \sum_{g \in G} f(g) \cdot ti(p_g) \quad (1.17)$$

$$a^E \leq a^E_{max} \cdot 1 \text{ and } a^v \leq a^v_{max} \cdot 1 \quad (1.18)$$

The value f(g) may set to 1 of only the number of aggregates is to be minimized or it may be set to c(g) if their rate should be taken into account. In the embodiment is used f(g)=c(g).

Objective Function:

Both the maximum traffic per network element and the overall capacity ($1\tau a^E$ or $1\tau a^V$) should be minimized but they represent potentially conflict goals. To avoid very long path, the objective function takes also the overall required capacity $1\tau a^Y$ into account:

$$M^x \cdot \leq \alpha_{max}^X + 1\tau a^Y \rightarrow \min. \quad (1.19)$$

The constants $M^X, M^V \in R_0^+$ control the tradeoff between the conflicting goals. A small $M^X$ favours little overall capacity while a large $M^X$ favours little maximum traffic per network element. In the embodiment X=V and Y=V.

Path constraints:

Like above, the flow conservation rule (equation (1.5)) and the exclusion of start and end nodes from cycles (equation (1.6)) have to be respected. For a single-path solution $p_g \in \{0,1\}^m$ is required. This, however, leads to a mixed trigger LP that takes a long computation time.

Therefore, $p_g \in \{0,1\}^m$ is used to get a non-integer LP. To obtain a desired single-path as primary path, the general multi-path is decomposed into single-paths and traffic distribution function. For the example is taken the single-path of the calculated multi-path structure with the largest traffic distribution function. Note that this decomposition is not unique and various results can be obtained depending on the implementation. This is very similar to the computation of a singe-shortest path.

Backup path computation with kDSP:

A set of disjoint single-path is required to build a backup path for a given primary path $p_g$. They can be obtained using kDSP algorithm. For that objective, first the links tr ($p_g$) contained in the primary path from the network. If the backup path should be both link and node disjoint with the primary path, the interior node ti($p_g$) are removed. Then the kDSP algorithm is running on the remaining network and the results provide the resulting structure of the backup path. If the primary path has not been found by the kDSP algorithm, a link and node disjoint backup path cannot always found although two disjoint paths may exist in the network.

Computation of an optimum backup path:

If a primary path is given, the optimum backup path together with the corresponding traffic distribution function can be obtained by a slight modification of the LP formulation. As $p_g$ already fixed, it is removed from the set of free variables. Then, the quadratic conditions in term of free variables in equation (1.11) and (1.12) disappear. In addition, the failure indication function $\Phi(p,s)$ is independent of any free variables. Therefore, this modification yields an LP formulation which can be solved efficiently. The so obtained backup path structure may have circles that do not increase the required capacity. When this path layout is configured in real time system, these circles must be removed. The corresponding elementary graph-theoretical operations are omitted, which are simple because the source and destination nodes are prevented to be part of a circle (equation (1.6)). However, the structure of the resulting backup path is potentially still very complex since the partial edge to edge paths are not necessarily disjoint and, therefore, this method is rather intended for comparison purposes and not in practice.

For the computation of disjoint multi-paths the kDSP algorithm is used which is simple and efficient to compute. However, it does not take general into account which is a different and a hard problem. Basically, the kDSP heuristic can be substituted by any other routing scheme yielding disjoint multi-path.

Computation of the traffic distribution function:

If the path layout for a safe protection multi-path or a path protection mechanism is given, a suitable traffic distribution function is required. First are presented some basics for failure-dependent traffic distribution and then are derived three different traffic distribution mechanism for safe protection multi-path. Finally, an adaptation to path protection is presented.

Basics for failure-dependent traffic distribution:

A self protecting multi-path consists kg link an (not necessarily) node disjoint paths (expect for source and destination) $p_g^i$ for $0 \leq i < k_g$ that be found, e.g. by a kDSP solution. It is represented by a vector of single path $Pg=(p_g^0, \ldots, p_g^{kg-1})\tau$. These paths are equal in the sense that they all may be active without any network failure.

Path failure pattern $f_g(s)$:

The path failure pattern is defined $fg(s) \in \{0,1\}^{kg}$ that indicates the failed partial path of the safe protection multi-path for g depending on the failure scenario s. It is composed $$f_g(s)=(\Phi(p_g^0,s), \ldots, \Phi(p_g^{kg-1},s))\tau \quad (1.20)$$

With a path failure pattern $f_g=0$ all paths are working $f_g=1$ connectivity cannot be maintained. The set of all different failures for safe protection multi-path Pg is denoted by $Fg=\{f_g(s):s \in S\}$.

Traffic distribution function:

For all aggregates $g \in G$, a traffic distribution function $l_g(f) \in (R_0^+)^{kg}$ must be found whose arguments are path failure pattern $f \in Fg$, They have to suffice the following restrictions:

$$1\tau l_g(f)=1. \quad (1.21)$$

Furthermore, failed paths must not be used, i.e.

$$f\tau l_g(f)=0. \quad (1.22)$$

Finally, the vector indicating the transported traffic aggregate g over all links is calculated by $P_g \tau l_g(f) \cdot c(g)$.

Equal traffic distribution:

The traffic may be distributed equally over all working paths, i.e.

$$l_g(f) = \frac{1}{1T(1-f)} \cdot (1-f) \quad (1.23)$$

Reciprocal traffic distribution:

The traffic distribution factors may be indirectly proportional to the length of the partial path (1τp). They can be computed for all partial paths.

$$(lg(f))_I = \frac{\frac{1-fi}{1^T(P_g)_i}}{\sum_{0 \leq j < k_g} \frac{1-fj}{1T(P_g)j}} \text{ for } 0 \leq i < k_g \quad (1.24)$$

Optimized traffic distribution:

Traffic distribution is optimal if the required capacity b to protect all aggregates g∈ G in all protected failure scenarios s∈ S is minimal. The free variables are $$b \in (R_0^+)^m, \forall g \in G \forall f \in F g: l_g(f) \in (R_0^+)^{kg} \quad (1.25)$$

The objective function is given by equation (1.13). The traffic distribution function constraints in equation (1.21) and (1.22) must be respected by all $l_g(f)$ and the bandwidth constraints are newly formulated.

Bandwidth constraints with capacity reuse:

The capacity must be large enough to accommodate the traffic in all protected failure scenarios s∈ S:

$$\forall_s \in S: \sum_{g \in G_s} Pg^\top l_g(f_g(s)) \cdot c(g) \leq b. \quad (1.26)$$

Bandwidth constraints without capacity reuse:

Releasing capacity unnecessarily leads to waste of bandwidth if it cannot be reused by other connections. Therefore, traffic distribution factor $l_g(f)$ if active paths must only increase in an outage scenario, except for failed paths for which they are zero. This quasi monotonictiy can be expressed by $$\forall g \in F_g: l_g(f) + f \geq l_g(f_g(0)), \quad (1.27)$$

are removed due to router failure. Thus, the bandwidth constraints are $$\forall g \in S: \underbrace{\sum_{g \in G_s} c(g) \cdot P_g^\top l_g(f_g(s))}_{(1) \text{ used capacity}} + \quad (1.28)$$

$$\underbrace{\sum_{g \in G_s} c(g) \cdot P_g^\top(f_g(s)) \cdot l_g(f_g(0))}_{(2) \text{ inactive partial path}} + \underbrace{\sum_{g \in G_s} c(g) \cdot P_g^\top l_g(f_g(0))}_{(3) \text{ removed aggregates}} \leq b$$

Note that the term $f_g(s) \cdot l_g(f(0))$ expresses an element-wise multiplication of two vectors. Hence, if bandwidth reuse is possible, equation (1.26) is used as bandwidth constraints, otherwise equations (1.27) and (1.28) must be respected. Neither protection constraints (equations (1.11) and (1.12)) nor path constraints (equation (1.5) and (1.6)) apply since the structure of the path is already fixed.

Adaptation of path protection:

The adaptation of the above explained traffic distribution scheme to path protection mechanism is simple. The primary path pg is denotes together with its disjoint backup single-paths as safe protection multi-path $P_g$ with $p_g = (P_g)_0$. The essential difference between the path protection scheme and the safe protection multi-path is that the path failure pattern $f_g^{PP}(s)$ is described by $$f_g^{PP}(s) = \begin{cases} u^0 & \Phi(p_g, s) = 0 \\ f_g(s) & \Phi(p_g, s) = 1 \end{cases} \quad (1.29)$$

with $u^0 = (0, 1, \ldots, 1)\tau$. By substituting the path failure pattern in equation (1.20) by (1.29), the traffic distribution optimization can be applied to path protection schemes.

The approaches above for finding the structure—in our case linear programs—have to be taken also only as a favoured realization. It might be reasonable to use other or additional constraints that reflect additional networking side conditions. If the network becomes large, the solution approach with linear programs can fail due to the computational expenses. Then, faster heuristics (e.g. genetic algorithms or simulated annealing) must be applied to find the layout of the routing structures as well as a suitable load balancing to achieve suboptimal results.

Apart from that there is a related problem that can be solved by the proposed forwarding paradigms. In the description above we took for the sake of simplicity a network topology, configured the structures, and dimensioned the link sizes of the network such that no quality of service (QoS) degradation is observed if traffic is rerouted in a failure case. The structures—primary path together with backup multi-path or SPM—can also be applied if the network topology is given together with the link capacities. Then, different algorithms approaches have to be taken to configure the forwarding structures and to maximize the amount of traffic that can be transported with resilience guarantees in the network. Above, the traffic amount is given and the required capacity is minimized while here link sizes are fixed and the amount of traffic is maximized. These algorithms and approximative heuristics are necessary to make best use of the network capacity in combination with our forwarding structures.

The invention claimed is:

1. A method for providing a resilient multi-path connection, wherein traffic is distributed over several paths between edge devices of a communication network, comprising, in one or more devices connected to or forming part of the communication network, performing the following steps:
    calculating connection-specific traffic distribution functions of the multi-path connection based upon path failure patterns of the multi-path connection;
    selecting a traffic distribution function of the multi-path connection based upon the calculated connection-specific traffic distribution functions and based upon current path failure pattern of the multi-path connection; and
    distributing traffic into corresponding paths of the multi-path connection based upon the selected traffic distribution function.

2. The method as claimed in claim 1, wherein one path of multi-path is a primary path over which traffic is transmitted in a failure-free scenario and remaining paths are backup paths.

3. The method as claimed in claim 1, wherein the traffic of the multi-path connection is distributed over a plurality of primary paths over which the traffic is transmitted in a failure-free scenario.

4. The method as claimed in claim 1, wherein the calculation of the connection-specific traffic distribution functions of the multi-path connection depends on a topology of the communication network, routes of paths of the multi-path connection through the communication network, and both an expected traffic between the edge devices and available link capacities.

5. The method as claimed in claim 1, wherein the paths of the multi-path connection are logically or physically disjoint.

6. The method as claimed in claim 1, wherein the paths of the multi-path connection are link or node disjoint.

7. The method as claimed in claim 1, wherein a path failure pattern is a combination of detected active or inactive paths of the multi-path connection.

8. The method as claimed in claim 7, wherein a partial outage of a path is indicated as inactive by a failure information at the edge devices.

9. The method as claimed in claim 8, wherein a failure of a path due to an outage of a contained network element is indicated by a monitoring information which is periodically transmitted over the path.

10. The method as claimed in claim 1, wherein the traffic distribution function is optimized for likely and foreseeable path failure pattern.

11. The method as claimed in claim 1, wherein the path failure pattern is determined by the following equation:

$$f_g(s) = (\phi(p_g^0, s) \ldots (\phi(p_g^{kg-1}, s))^\tau \text{ with}$$

$\Phi(p,s)$ is a function indicating whether a partial (single) path p is active or inactive if a failure scenario s (set of failed network elements) occurs, and $F_g$ is the failure pattern comprising a set of active and inactive partial path $p^i_g$ within the multi-path $P_g$ for a connection g between two edge devices kg is the maximum number of partial paths $p^i_g$ within the multi-path $P_g$, i.e., $0 <= i < kg$.

12. The method as claimed in claim 1, wherein a primary capacity of a link is a capacity allocated to a flow if no failure occurs.

13. The method as claimed in claim 1, wherein the primary capacity of a link is reused and the traffic distribution function is computed by a linear program with several constraints whose optimization function is determined by following equation:

$$\forall g \in S: \sum_{g \in Gs} P_g \tau l_g(f_g(s)) c(g) \leq b \text{ with}$$

S is a set of all failure scenarios,

Gs is a set of all active aggregate connections in case of failure scenario s, $f_g(s)$ is the path failure pattern, $L_g(f)$ is a load distribution function based upon a failure pattern f, $P_g \tau l_g(f)^* c(g)$: $\tau$ transposes a proceeding vector, this computes a vector with a fraction of a traffic rate c(g) caused by the multi-path Pg and a rate c(g) of a aggregate connection g, b is a vector with a capacity of links which are larger than corresponding traffic rates caused by any failure scenario and $$\sum_{g \in Gs} c(g) P_g \tau l_g(f_g(0)) \leq b.$$

14. The method as claimed in claim 1, wherein the primary capacity of a link is not reused and the traffic distribution function is computed by a linear program with several constraints whose optimization function is determined by following equations:

$$\forall g \in S: \sum_{g \in Gs} P_g \tau l_g(f_g(s)) c(g) \leq b \text{ and}$$

$$\forall g \in F_g: l_g(f) + f \geq l_g(f_g(0)) \text{ with}$$

S is a set of all failure scenarios,

Gs is a set of all active aggregate connections in case of failure scenario s, $f_g(s)$ is the path failure pattern, $L_g(f)$ is a load distribution function based upon a failure pattern f, $P_g \tau l_g(f)^* c(g)$: $\tau$ transposes a proceeding vector, this computes a vector with a fraction of a traffic rate c(g) caused by a multi-path $P_g$ and a rate c(g) of a aggregate connection g, b is vector with a capacity of links which are larger than corresponding traffic rates caused by any failure scenario and $$\sum_{g \in Gs} c(g) P_g \tau l_g(f_g(0)) \leq b.$$

15. The method as claimed in claim 1, wherein the step of calculating is performed in a calculator.

16. A non-transitory computer readable medium having stored thereon a set of computer readable instructions for providing a resilient multi-path connection, wherein traffic is distributed over several paths between edge devices of a communication network, the set of computer readable instructions comprising:

a program subroutine for calculating connection-specific traffic distribution functions of the multi-path connection based upon path failure patterns of the multi-path connection;

a program subroutine for selecting a traffic distribution function of the multi-path connection based upon the calculated connection-specific traffic distribution functions and based upon current path failure pattern of the multi-path connection; and a program subroutine for distributing traffic into corresponding paths of the multi-path connection based upon the selected traffic distribution function.

17. The non-transitory computer readable medium as claimed in claim 16, wherein the calculation of the connection-specific traffic distribution functions of the multi-path connection depends on a topology of the communication network, routes of paths of the multi-path connection through the communication network, and both an expected traffic between the edge devices and available link capacities.

* * * * *